D. LEVIN.
PROCESS FOR MAKING HYDROGEN PEROXID.
APPLICATION FILED FEB. 3, 1916. RENEWED AUG. 14, 1918.
1,299,485.
Patented Apr. 8, 1919.
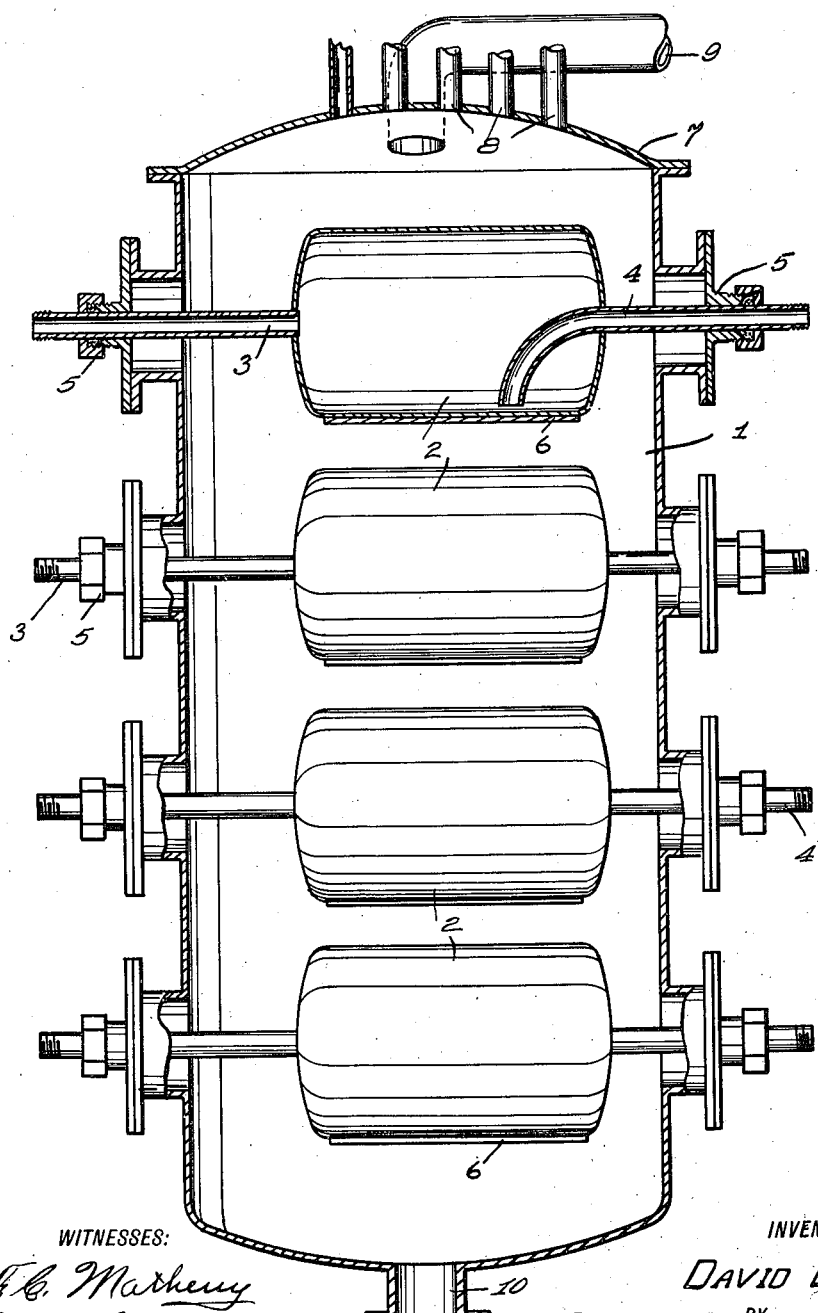
WITNESSES:
INVENTOR
DAVID LEVIN
BY
ATTORNEY

UNITED STATES PATENT OFFICE.

DAVID LEVIN, OF BUFFALO, NEW YORK, ASSIGNOR TO COMMERCIAL ELECTROLYTIC CORPORATION, OF NEW YORK, N. Y., A CORPORATION OF NEW YORK.

PROCESS FOR MAKING HYDROGEN PEROXID.

1,299,485.     Specification of Letters Patent.    Patented Apr. 8, 1919.

Application filed February 3, 1916, Serial No. 76,033. Renewed August 14, 1918. Serial No. 249,883.

*To all whom it may concern:*

Be it known that I, DAVID LEVIN, a citizen of the United States, residing at Buffalo, in the county of Erie and State of New York, have invented certain new and useful Improvements in Processes for Making Hydrogen Peroxid, of which the following is a specification.

This invention relates to improvements in the method of producing hydrogen peroxid and the object of the improvement is to simplify the process and the apparatus employed so that the hydrogen peroxid may be produced more economically for commercial purposes.

In the production of persulfuric acid and persulfate by electrolysis it is well known that due to the high current density at the anode anodic particles are formed in the solution. These particles that are thus formed exist in a sort of collodial solution and in the manufacture of hydrogen peroxid by distillation they act as powerful catalytic agents in destroying persulfuric acid persulfates and peroxids especially at a high temperature where the decomposition is rapid thereby occasioning the loss of a considerable amount of available oxygen and rendering the manufacture of peroxid in commercial quantities by this method difficult and expensive.

By experiment I have found that where the persulfurate acid solutions are filtered before distilling them in the manufacture of hydrogen peroxid a large percentage of the anodic particles are filtered out, thus making it possible to obtain a much larger yield of peroxid in proportion to the current used.

As an example of a suitable filter, I have found porous earthenware to fill all requirements.

I prefer to use porous earthenware slabs for filtering purposes, since the anode platinum particles with which the solution becomes contaminated are so fine as to go through any ordinary filtering material, whereas a fine earthenware filter is found to separate them from the solution.

I have further found that in the known methods of making peroxid from persulfuric acid or persulfates the yield of peroxid rapidly diminishes as the chemicals are used over and over again due to the accumulation in the solution of catalyzing agents, but when I precipitate these from the warm acid solution by hydrogen sulfid before electrolyzing again then I am able to get a good yield of hydrogen peroxid even by the long continued use of the same chemicals.

I prefer to use hydrogen sulfid as a precipitating agent for the reason that it separates out first the lead and the platinum that becomes dissolved in the solution in the course of working the process.

It is known that it is possible to produce hydrogen peroxid by the reaction of dilute sulfuric acid on persulfates as potassium persulfate and that much higher yields of peroxid are obtained by this method. Potassium persulfate is more stable than persurfuric acid and not so easily affected by catalyzing agents and when distilled with sulfuric acid it is hydrolyzed gradually into potassium bisulfate and hydrogen peroxid, the peroxid distilling over as fast as it is formed and being removed from the sphere of action, whereas in the case of persulfuric acid this acid is readily hydrolyzed into caro acid and then peroxid faster than the peroxid can be distilled off; thus the peroxid is in contact with the oxidized acids for a considerable length of time and the two decompose each other, the result being a considerable loss of available oxygen.

However the higher yield obtained by the use of potassium persulfate in the manufacture of hydrogen peroxid is not enough to overbalance the disadvantages of this method that render it impractical from a commercial standpoint. For instance when a solution of potassium bisulfate and sulfuric acid are electrolyzed a solid precipitate of potassium persulfate is formed in the cell and the cell must be emptied much more often than where persulfuric acid is used. This solid precipitate is troublesome to remove from the cell and after removal must be separated from the liquid with which it is mixed by filtration and then be crystallized before it can be subjected to distillation. All of these steps consume time and labor and occasion a loss of chemicals due to handling and especially due to the process of crystallization thus rendering this method more costly than the other method employing persulfuric acid and wherein there is no solid precipitate to handle.

After a period of research and experiment in attempting to overcome this objectionable and expensive feature of handling a solid precipitate I have discovered that by electrolyzing a solution of sodium bisulfate ($NaHSO_4$) containing sulfuric acid that a fifteen per cent. solution of sodium persulfate is formed which remains in solution without the separation or precipitation of any solid. This solution acts like potassium persulfate in that it is very stable and very slowly hydrolyzed directly into sodium bisulfate and hydrogen peroxid thereby making it possible for the hydrogen peroxid to be distilled off as fast as it is formed instead of being in contact with oxidized acids which tend to decompose it.

The advantage of this process over the process involving the use of potassium persulfate is great because of the fact that no solid precipitate is formed by electrolysis and a great saving in time, chemicals and labor is effected. The advantage of this method over the method involving the use of persulfuric acid resides in the fact that a much higher yield of peroxid is obtained.

The sodium bisulfate used in the electrolytic process may be obtained by treating sodium bicarbonate with sulfuric acid.

In the drawing, the figure is an elevational view of an apparatus for carrying out my invention, part being broken away to show the interior construction.

In the distillation of hydrogen peroxid from sodium persulfate I preferably employ the apparatus shown in the accompanying drawings in which the numeral 1 indicates a vertically arranged cylindrical casing within which are disposed a plurality of horizontal drums 2 arranged one above another in spaced relation and supported by inlet pipes 3 and outlet pipes 4 disposed axially of the drums 2 and transversely of the casing 1 and extending outwardly through suitable stuffing boxes 5 provided on the sides of the casing.

The outlet pipes 4 are preferably curved downward within the drums 2 and terminate in open ends at a point near the bottom of such drums so that if any appreciable amount of water condenses and collects in the bottom of the drums it will be forced out through the outlet pipes. The bottom of each of the drums 2 is provided with a narrow strip of metal 6 which may preferably be V shape in cross section to facilitate the dripping of liquid from the lower periphery of the drums.

The casing 1 is provided with a removable cover 7 having a plurality of inlet pipes 8 for chemical solution that are arranged substantially in line above the top drum and through which sodium persulfate may be discharged slowly and evenly onto the periphery of the top drum 2. The cover plate 7 is further provided with a condenser pipe 9 of relatively large diameter which leads to a condenser (not shown) and through which the vaporized products of distillation are taken off.

The lower end of the casing 1 is provided with a discharge opening 10 through which the solutions that remain after distillation are conducted away.

All of the metallic parts of the apparatus that come in contact with chemical solutions, including the inside surface of the casing 1, the outside surface of the drums 2 and all exposed parts of pipes and the like are necessarily coated with a thick surface of glass enamel in order to withstand the action of the chemical solutions.

In operation steam under a relatively low pressure is caused to flow through the pipes 3 into the drums 2 and thence outwardly through the pipes 4 thus heating the drums to a constant temperature. After the drums are heated the chemical solution as sodium persulfate is admitted slowly through the pipes 8 onto the uppermost drum 2 and spreads out in a thin film and flows downwardly over the cylindrical surface of such drum until it reaches the bottom and drips from the cross piece 6 onto the next lower drum to repeat the same process over each drum until the hydrogen peroxid is all evaporated and carried off through the pipe 9 and sodium bisulfate is left to be discharged through the opening 10. The sodium bisulfate may then be purified by the use of hydrogen sulfid, a small amount of water added and the same electrolyzed and distilled again, thus making a continuous cyclic process with comparatively small loss or consumption of chemicals in proportion to the amount of hydrogen peroxid produced.

As an example of this process: Sodium bisulfate is formed by the reaction of sulfuric acid on sodium bicarbonate, sulfuric acid being used somewhat in excess. This sodium bisulfate is then subjected to electrolysis for approximately eight hours in a cell having platinum anodes that are kept cold by refrigeration, and a fifteen per cent. solution of sodium persulfate is formed, the sodium persulfate is then distilled in the apparatus shown in the drawings, hydrogen peroxid coming off as a vapor and sodium bisulfate remaining, the sodium bisulfate is then purified by the use of hydrogen sulfid, a small amount of water is added and the same is used again.

What I claim is:

1. The process of producing hydrogen peroxid which consists in purifying a solution containing the radical of persulfuric acid by filtering and separating the peroxid.

2. The process of producing hydrogen peroxid which consists in purifying a solution containing the radical of persulfuric acid by filtering through an earthenware filter, and separating the peroxid.

3. A continuous process of manufacturing hydrogen peroxid which consists in separating the hydrogen peroxid from an electrolyte and then purifying the electrolyte with hydrogen sulfid before reëlectrolyzing it.

4. A continuous process of manufacturing hydrogen peroxid which consists in electrolyzing an acid solution of sodium bisulfate, separating the hydrogen peroxid and reëlectrolyzing the electrolyte.

5. A continuous process of manufacturing hydrogen peroxid which consists in electrolyzing a solution of sodium bisulfate, separating the hydrogen peroxid, purifying the electrolyte with hydrogen sulfid, and re-electrolyzing the electrolyte.

6. A continuous process of manufacturing hydrogen peroxid which consists in electrolyzing a solution of sodium bisulfate to produce a 15% solution of sodium persulfate, separating the hydrogen peroxid, purifying the electrolyte with hydrogen sulfid and re-electrolyzing the electrolyte.

Signed by me at Seattle, Washington, this 28th day of Sept., 1915.

DAVID LEVIN.

Witneses:
　GEORGE R. MARTIN,
　LOUIS A. MOLIN.